April 11, 1939.  J. R. GARRISON  2,153,829
GEAR CHUCK
Filed Sept. 25, 1935   3 Sheets-Sheet 3
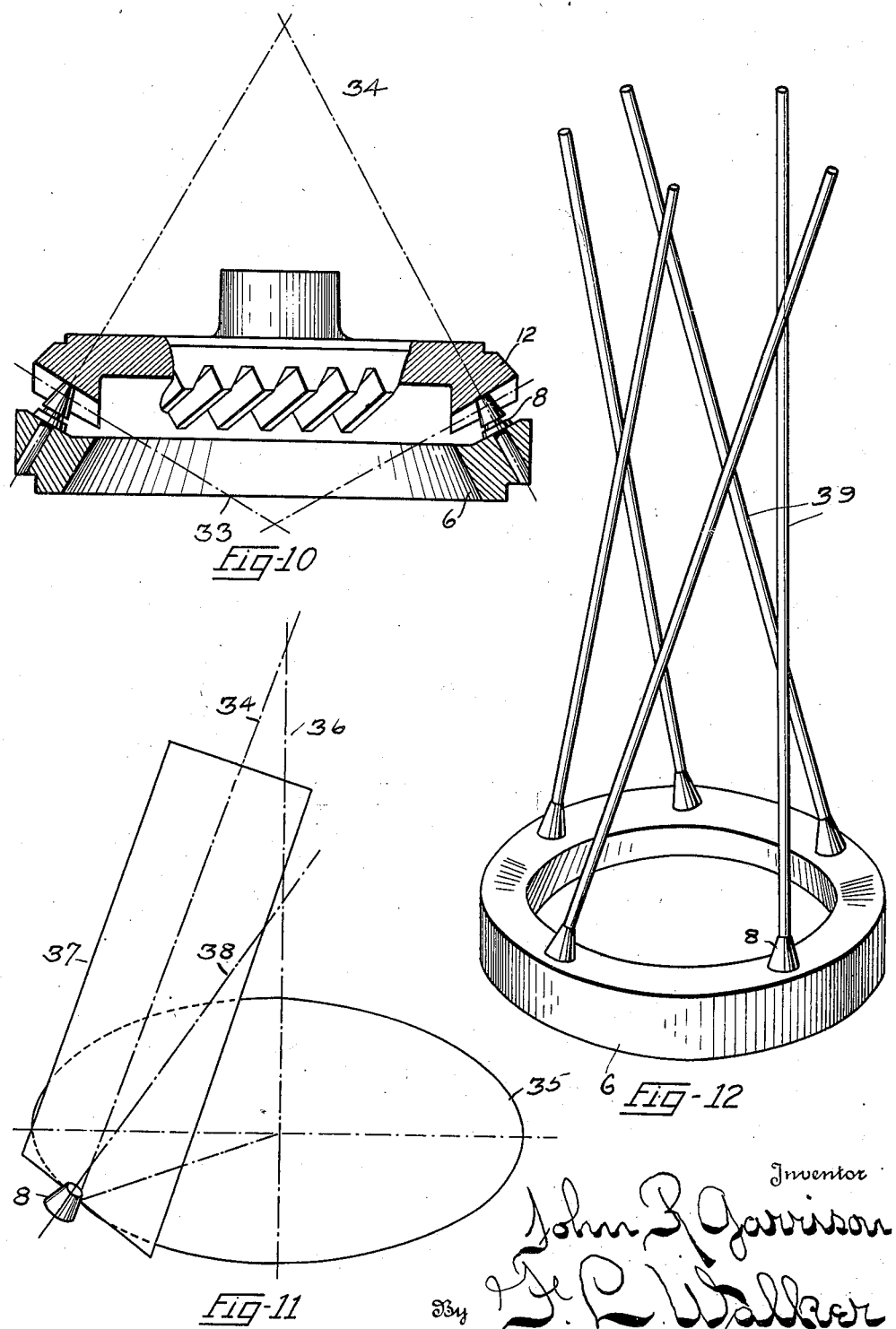

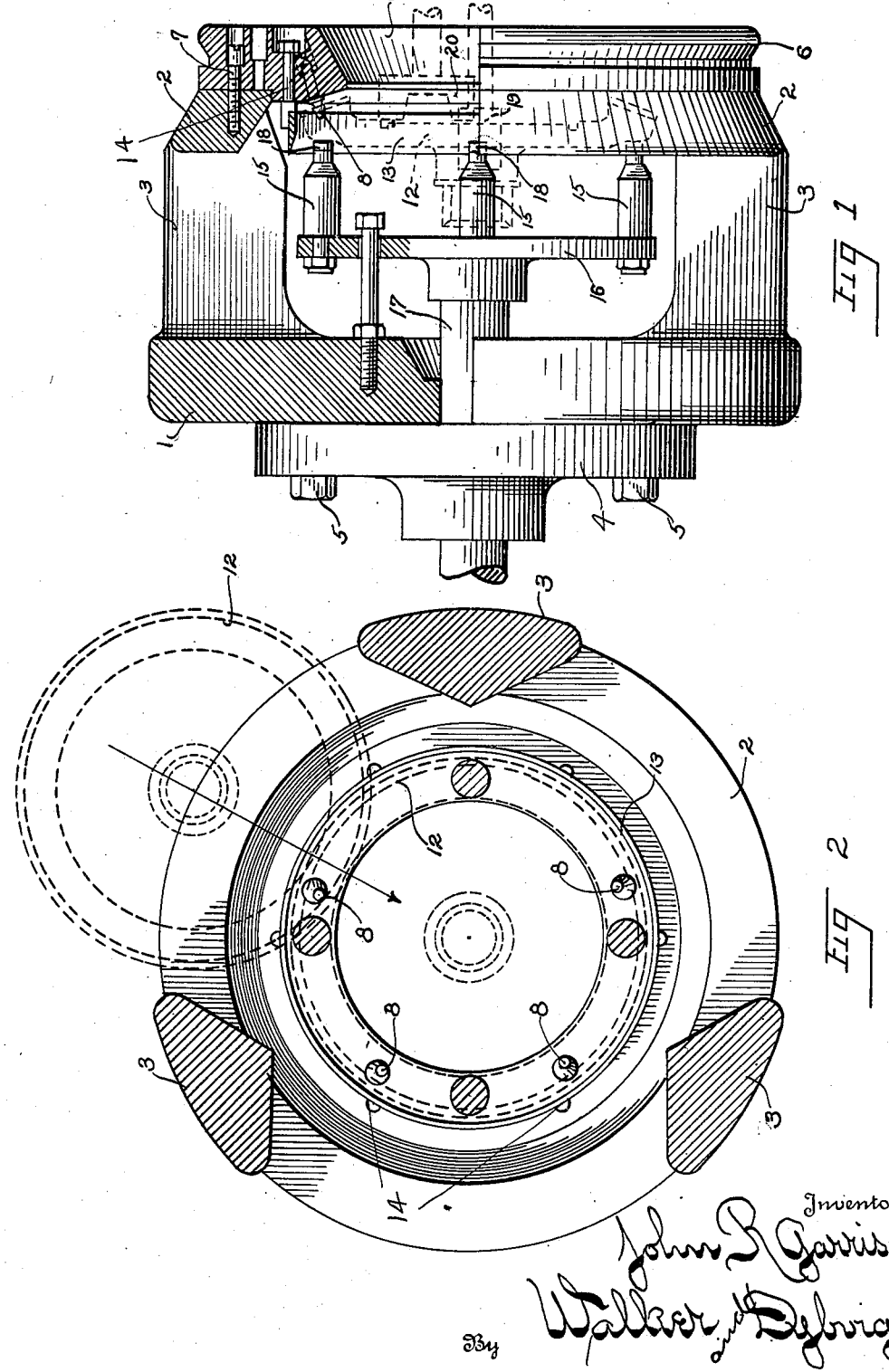
April 11, 1939. J. R. GARRISON 2,153,829
GEAR CHUCK
Filed Sept. 25, 1935 3 Sheets-Sheet 1

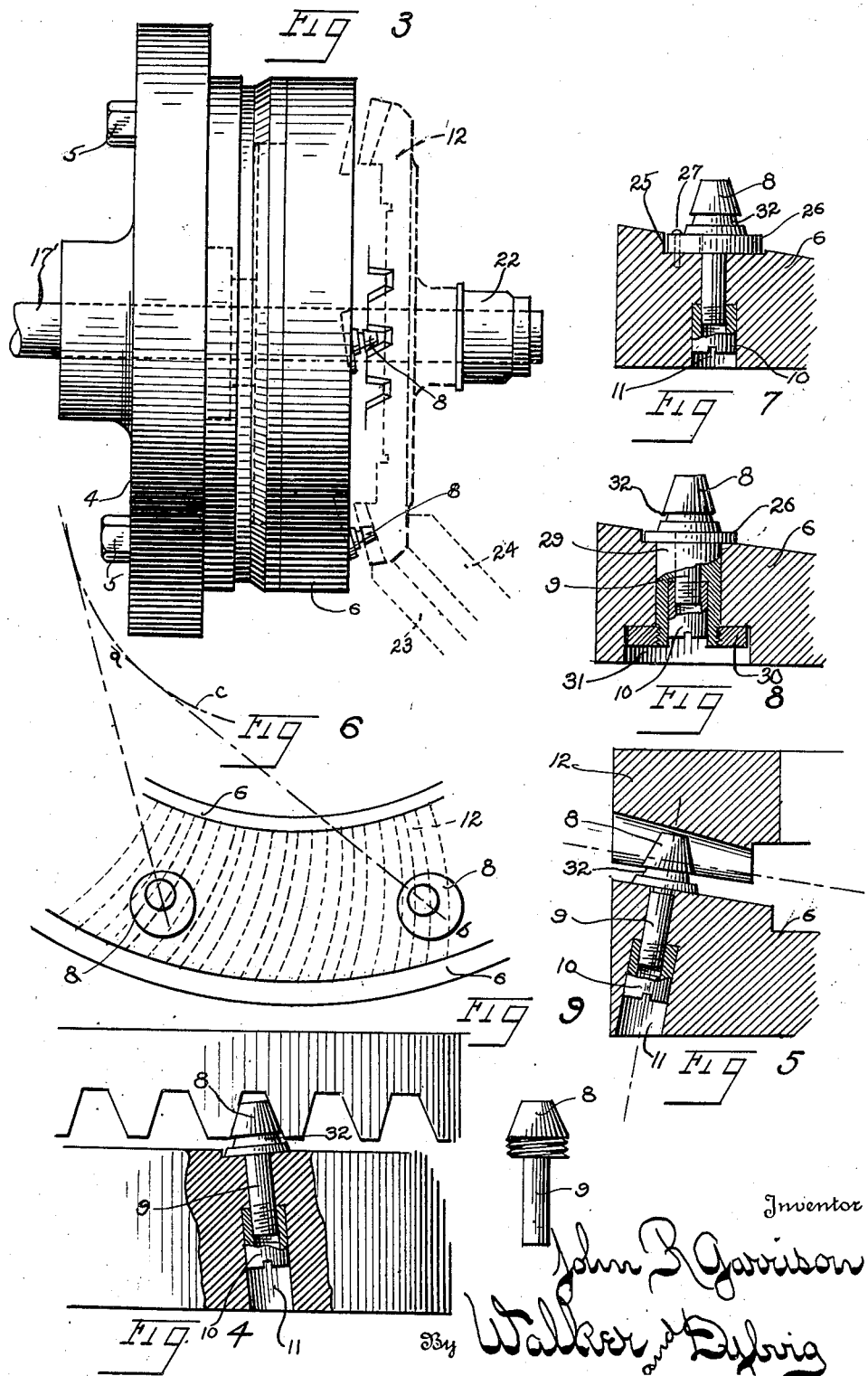

Patented Apr. 11, 1939

2,153,829

UNITED STATES PATENT OFFICE 2,153,829

GEAR CHUCK

John Russell Garrison, Dayton, Ohio, assignor to Garrison Machine Works, Inc., Dayton, Ohio, a corporation of Ohio Application September 25, 1935, Serial No. 42,101

13 Claims. (Cl. 279—1)

This invention relates to chucks and work holders and more particularly to a gear chuck for centering and holding beveled gears while performing refinishing, boring or grinding operations thereon. It is to be understood however that the present device is adaptable for gears of other shapes than that shown and in appropriate size and form and may be employed for holding articles other than gear wheels. The present construction is a further development and improvement of that disclosed in Letters Patent No. 1,470,158 and No. 1,561,843.

The construction herein adopted for illustrative purposes, like that shown in the Letters Patent mentioned, embodies a series of angularly disposed spaced projections or studs which project between the teeth of a bevel gear and are engageable therewith upon the pitch line of the gear. However in the present construction the projections or studs are not only inclined relative to each other in converging relation substantially perpendicular to the face of the gear to be supported but they are also laterally inclined circumferentially relative to the gear. That is to say, instead of being inclined in radial planes of the gear, as in the earlier patent disclosures mentioned, the present studs or projections are inclined in planes tangential to a common circle intermediate the stud location and the center of the chuck and thus do not present a symmetrical appearance when viewed laterally. In the present instance provision is made to compensate for wear by enabling successive partial rotations of the stud and by providing such clearance or recesses substantially coincident with the crowns of the gear teeth that abutment shoulders may not be worn upon the studs upon which the gear teeth might be unintentionally supported in false position.

The object of the invention is to simplify the construction as well as the means and mode of operation of work holders whereby they may not only be economically manufactured but will be more efficient and accurate in use adaptable to a wide variety of work pieces, of relatively few parts and unlikely to get out of repair.

A further object of the invention is to provide a work holder having feeding projections arranged in askew relation to more accurately correspond to certain types of work to be engaged thereby.

A further object of the invention is to provide an improved form of mounting for the locating stud to provide interchangeability and adjustment thereof to compensate for wear.

A further object of the invention is to provide a locating stud proportioned and arranged so as to obviate the formation of stops or abutment shoulders thereon by wear and long use upon which the gear or other work piece may come to rest in an abnormal or false position.

A further object of the invention is to provide an improved mounting head for the work holder.

A further object of the invention is to facilitate loading of the work holder or chuck.

A further object of the invention is to provide guide means for initially positioning the work in relation with the chuck or work holder to prevent injury to the work locating stud.

A further object of the invention is to provide improved holding means for retaining the work in its adjusted relation upon the chuck.

A further object of the invention is to provide a chuck or work holder possessing the meritorious characteristics and advantageous features of construction herein mentioned.

With the above primary and other incidental objects in view, as will more fully appear in the specification, the invention consists of the features of construction, the parts and combinations thereof, and the mode of operation, or their equivalents, as hereinafter described and set forth in the claims.

Referring to the accompanying drawings wherein is shown the preferred but obviously not necessarily the only form of embodiment of the invention, Fig. 1 is a side elevation partly in section of an assembled chuck or work holder and the mounting head therefor together with holding means for maintaining the work in its adjusted relation upon the chuck.

Fig. 2 is a transverse sectional view of Fig. 1.

Fig. 3 is a side elevation of a modified form of mounting head and holding means.

Fig. 4 is a side elevation of one of the locating studs viewed in the direction of the gear teeth engaged thereby and illustrating the tilted position of the locating stud in a circumferential direction relative to the gear.

Fig. 5 is a similar detail view of the relation of the locating stud and gear viewed at right angles to that of Fig. 4 and illustrating the inclination of the stud in a raidal plane.

Fig. 6 is a top plan view illustrating the direction of inclination of the mounting stud in a tangential plane.

Figs. 7 and 8 are detail views illustrating other methods of mounting the locating stud to afford interchangeability and rotative adjustment to compensate for wear.

Fig. 9 is a view showing a modified form of locating stud.

Fig. 10 is a view, partly in section and partly in elevation, showing the work holding member and the spiral bevel gear mounted thereon, and illustrating diagrammatically the pitch cone of the gear and a cone having all of its elements normal to the corresponding elements of the pitch cone of the gear.

Fig. 11 is a diagrammatic view illustrating the position of the mounting shaft forming a part of the work holder.

Fig. 12 is a diagrammatic illustration of the inclination of the mounting stud relative to the remainder of the work holder.

Like parts are indicated by similar characters of reference throughout the several views.

For illustrative purposes but with no intent to unduly limit the application nor scope of the invention, the assembly herein shown and described is especially designed for grinding the rear side and bore of a typical automotive driving gear of the spiral bevel type.

Referring to Figs. 1 and 2 of the drawings, the work holder or chuck, which is interchangeable with other chucks or work holders of different sizes and adapted to other work pieces, is detachably mounted upon a carrier or mounting head comprising a base or body portion 1 and a relatively spaced annular ring portion 2 interconnected with the base or body portion 1 at circumferentially spaced intervals by interposed, integral piers 3. This mounting head is secured to the spindle of the processing machine by the use of a conventional face plate 4 to which it is detachably secured by screw studs 5.

Detachably secured to the outer face of the annular portion 2 of the mounting head is a locating ring 6 secured to the annular portion 2 of the mounting head by spaced studs 7. This locating ring 6 is interchangeable with other rings of like size but having locating studs thereon differently arranged to accommodate gears or other work pieces of different sizes and shapes.

In the present form of device adapted for illustrative purposes the inner face of the locating ring 6 is slightly concave projecting from which is a circular series of relatively spaced conical studs or locating projections 8. Each stud is provided with a truncated conical head and an elongated cylindrical stem 9 terminally threaded for reception of a retaining nut 10 seated within a countersink 11 in the outer face of the locating ring 6. The retaining nuts 10 are provided with polygonal wrench sockets or with screw driver or spanner slots by which the nut may be tightened to hold the locating studs 8 in their positions of locative adjustment.

These locating studs 8 are normally, although not necessarily, positioned with their axes in ninety degree relation with the pitch angle of the gear to be chucked, in order to insure maximum surface contact between the pin or stud and the gear teeth. When operating upon a spiral bevel gear the sides of the teeth of which are not symmetrical to the plane of such gear it is found advantageous to incline the locating stud 8 in a circumferential direction in addition to their inclination into right angle relation with the pitch angle of the gear. As the result of this compound inclination, the studs 8 assume somewhat askew relation to the plane of the gear wherein they are inclined in planes tangential to a common circle between the locations of the studs and the center of the assembly. This double inclination of the locating studs is clearly illustrated in Figs. 4, 5, and 6. As shown in Fig. 4 the profiles of the adjacent faces of succeeding teeth of the gear, between which the studs engage, are not identical. The stud however is disposed with its axis bisecting the general angle of the adjacent faces of the teeth and is therefore inclined to the plane of the gear to be operated upon in a plane transversely to the teeth. At the same time, as shown in Fig. 5, the studs are inclined inwardly, in the present instance, with their axes perpendicular to the pitch line of the gear. The resultant of these inclinations of the studs is in the plane $a—b$ tangential to a concentric circle $c$ as shown diagrammatically in Fig. 6. It will be understood that the degree of inclination of the locating studs 8 will vary according to the variations of the gear to be chucked. The gear to be operated upon which is shown by dotted lines at 12 is introduced between any two of the connecting piers 3 of the mounting head. In order that the gear may be preliminarily located in concentric relation with the series of studs 8, there is provided a loading ring 13 positioned in concentric relation with the position of the gear when engaging the locating studs 8 and supported in spaced relation with the locating ring 6 upon a series of posts or pins 14 secured in spaced holes in the locating ring 6. The loading ring 13 insures that the gear 12 to be chucked shall engage the locating studs by an axial movement thereby saving the stud from becoming battered, broken or otherwise injured in the process of loading the chuck.

The gear 12 is securely held in its located position by thrust pressure of a series of plungers 15 carried upon a spider or head 16 adapted for axial movement toward and from the gear 12 by reciprocation of a thrust rod 17 extending through the mounting head and the face plate of the machine upon which the assembly is mounted. The gear engaging posts or fingers 15 preferably although not necessarily are provided with replaceable hardened metallic heads or pads 18. Such contact heads or pads 18 are replaced by new ones as they become worn. The thrust rod 17 is subjected to spring tension in an axial direction sufficient to hold the gear 12 securely and firmly upon the studs 8 of the locating ring 7 while being subjected to grinding or other machining or finishing operation. Merely for illustrative purposes there has been indicated by dotted lines in Fig. 1 two grinding wheels 19 and 20, one of which is shown positioned to grind the bore of the gear while the other wheel which is of cup shaped form is shown applied to surface finishing the front face of the gear.

As illustrated in Fig. 3 the locating ring 6 carrying the inclined conical studs 8 is secured to a mounting ring 21 which in turn is attached to the face plate 4 of the machine. In this instance the locating ring 6 is turned with its gear engaging face outwardly or the reverse of that illustrated in Fig. 1. The gear 12 is held in engagement with the locating studs 8 by the retractive pull upon the draw bar 17' which is provided at its outer end with an abutment head 22 having axial thrust engagement with the hub of the gear. In this assembly grinder wheels 23 and 24 are indicated by dotted lines as operatively engaging the peripheral rim and rear face of the gear 12.

Due to the pressure with which the gear 12 operated upon is forced upon the locating studs 8 in order to resist heavy processing cuts taken from the gear surface and the resulting wedging of the studs 8 between the opposing faces of the gear teeth of dissimilar profile, there may be a tendency to loosen the studs upon the rotating ring 6 as the finished gears are moved and hence the stems or shanks of the studs 8 are threaded for reception of the locking nut 10 which will resist extraction of the studs that hold them in their positions of rotative adjustment. As the locating studs become worn by long use the nuts 10 may be relieved and the studs turned through a limited partial rotation thereby presenting new surfaces for contact with the opposing faces of adjacent gear teeth.

In Fig. 7 the locating ring 6 is shown formed with a depressed seat 25 upon which is located a hardened steel protective collar or washer 26 beneath the head of the locating stud 8 and held in place by a screw or pin 27. This hardened seat 26 will take the wear of gears being roughly placed upon the studs and eliminates the possibility of the locating ring being indented by the head of the locating stud and thereby prevent inaccuracies when it becomes necessary to turn the stud to compensate for wear on the side of the conical head thereof. In Fig. 8 the hardened seat 26 upon the head of the locating stud comprises the flanged top of a bushing 29 held in place by a spanner nut 30 within the recess 31 in the opposite side of the locating ring 6. The hardened bushing 29 is counterbored to receive the nut 10 threaded upon the shank or stem 9 of the stud in the same manner as afore described.

While the head of the locating studs 8 may be of continuous unbroken conical formation from their tops to their bases it is found that after long periods of use without rotative adjustment of the pins flats may be worn upon opposite sides of the conical head which flats terminate coincident with the crowns of the teeth of the gears in slight offsets or shoulders which in time may become resting places for the gear teeth and so support the gear in a false position out of proper locating contact with the tapered faces of the stud head. To obviate the danger of such stop shoulder being worn into the face of the stud head, the head is preferably provided with a peripheral groove 32 substantially coincident with the crowns of the gear teeth when the gear is positioned upon the chuck or work holder. This peripheral groove 32 affords clearance and any wearing or flattening of the conical surface of the stud head will terminate at the groove, the undercutting of which will prevent the formation of a shoulder or offset. Such peripheral groove 32 is also useful for engagement of a pulling device to facilitate extraction of the stud when it is necessary that they be replaced.

In the event that the stud is of relatively large diameter the base of the conical head may be reduced to cylindrical form as shown in Fig. 9, in lieu of providing the peripheral clearance groove 32. In the form illustrated in Fig. 9 the cylindrical facing of the stud head extends above the plane of the crowns of the teeth 13 so that any worn or flat surface upon the tapered portion of the head will merge into the cylindrical facing at the base of the stud head without forming a stop shoulder or offset upon which the gear teeth might accidentally rest. In the event that the stud is formed with such cylindrical portion adjacent to its base, this portion, if desired, may be screw threaded for reception of a stud extractor having a screw threaded socket for engagement with such threaded cylindrical portion of the stud head.

While the locating studs are preferably positioned with their axes perpendicular to the pitch line of the gear to be engaged, as is shown in Fig. 5, it may be necessary to change the relation of the stud axis with reference to the pitch angle to accommodate the locating ring to the size or swing of the machine upon which it is to be used. In such case the rotating stud may be set in perpendicular relation to the plane of the ring 6 as is shown in Figs. 7 and 8 and hence less than ninety degrees in relation to the pitch angle of the gear. Where for any reason the diameter of the locating ring must be held to a minimum dimension, the locating studs 8 may be inclined in a reverse or outwardly directed relation contrary to that shown in Fig. 5. To facilitate adjustment of the locating stud to compensate for wear, the stud is preferably although not necessarily provided with an indicator mark to be correlated with an index mark upon the locating ring by which the operator may gage the amount of rotative adjustment given to the stud from time to time to compensate for wear.

The inclination of the stud 8 is clearly illustrated in Figs. 10, 11 and 12. In Fig. 10, wherein a gear 12 is shown properly positioned with respect to the locating ring 6 and supported by the studs 8 which engage the teeth of the gear, the pitch cone of the gear 12 is shown by the dot-dash line 33. A cone, all of the elements of which are normal to the corresponding elements of the pitch cone of the gear 12, is shown by the dot-dash line 34. From this illustration, it is seen that the axes of the studs 8 lie in planes tangential to a cone, all of the elements of which are normal to the corresponding elements of the pitch cone of the gear 12.

Referring to Fig. 11, a diagrammatic illustration, the base of the cone formed by the line 34 is designated by the numeral 35, and its central axis by the numeral 36. As illustrated in this figure, the axis of the stud 8 shown therein lies in a plane 37 tangential to the cone formed by the line 34, and which cone is shown in Fig. 10. At the same time, the axis of the stud 8, as illustrated by the dot-dash line 38, forms an oblique angle with the line of tangency between the plane 37 and the cone as illustrated by the line 34. That is, the studs 8 are inclined inwardly and laterally relative to the central longitudinal axis of the gear 12. This is clearly shown in Fig. 12 wherein the studs 8 on the locating ring 6 have been extended as at 39, the studs being so angled that no matter how far extended they would never meet.

From the above description it will be apparent that there is thus provided a device of the character described possessing the particular features of advantage before enumerated as desirable, but which obviously is susceptible to modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. In a chuck for bevel gears, a support, a series of relatively fixed spaced studs carried thereby and engageable between succeeding teeth of a gear to locate the gear in predetermined position relative to the support, the axes of said studs being inclined to lie in planes substantially tangential to a cone, the elements of which are normal to corresponding elements of the pitch cone of the gear, and forming oblique angles with the lines of tangency between the planes and the cone, and means for holding the gear in engagement with the studs.

2. In a work locating device for bevel gears, a supporting structure, a series of relatively spaced fixed locating studs carried thereby for engagement with the teeth of the gear, said studs being disposed with their axes inclined to lie in planes substantially tangential to a cone, the elements of which are normal to corresponding elements of the pitch cone of the gear, and forming oblique angles with the lines of tangency between the planes and the cone.

3. In a work holder of the character described, a supporting member, a series of relatively spaced projections engageable with the work for locating the work in predetermined relation with the support, an upstanding guide flange extending beyond the plane of the work engaging projections and approximately conforming to the peripheral contour of the work for guiding the work into engaging relation with the projections in a direction substantially perpendicular to the general plane of the face of the work to be engaged and minimizing lateral impact engagement of the work with said projections, and means for holding the work in engagement with the projections.

4. In a chuck for bevel gears, a work support, a series of relatively spaced fixed locating studs projecting from the face of the support and engageable between adjacent faces of succeeding teeth of the gear to be chucked, a cylindrical loading ring surrounding the gear position and adapted to guide the gear axially into engagement with the locating studs and minimize lateral impact engagement of the gear therewith, and means for holding the gears in engagement with the studs.

5. A work holder of the character described including a support, a series of relatively spaced fixed locating studs projecting from the face thereof and engageable with a work piece for positioning the work piece in predetermined relation with the support, said studs each including a work engaging head and a shank of reduced diameter, the support having spaced counterbored holes therein to receive the shanks of the studs, nuts screw threaded upon the shanks within the counterbored holes to fixedly secure the studs in their adjusted position, and means for holding a work piece in engagement with the studs.

6. In a gear chuck of the character described, a support, a locating stud carried thereby for engagement intermediate the adjacent faces of contiguous teeth of a gear for locating the gear in predetermined relation with the support, including a conical tooth contacting portion terminating in spaced relation with the support and a cylindrical shank, of reduced diameter, the support having a counterbored hole within which the shank of the stud is revolubly adjustable to present successive portions of the head in engagement with the work, a clamp nut screw threaded upon the shank of the stud within the counterbored hole for locking the stud in its position of rotative adjustment, and means for holding a gear in engagement with the stud.

7. In a gear chuck of the character described, a support, a locating stud carried thereby for engagement intermediate adjacent faces of contiguous teeth of a gear for locating same in relation to the support, said stud including a gear engaging head and a cylindrical shank of reduced diameter revoluble relative to the support to present successive portions of the head in gear contacting relation, a seat for the head of the stud disposed in a plane divergent with the adjacent area of the support, means for fixedly locking the stud in any one of several positions of rotative adjustment, and means for holding a gear in engagement with the stud.

8. In a gear chuck of the character described, a support, a locating stud carried thereby for engagement intermediate adjacent faces of contiguous teeth of a gear for locating same in relation to the support, said stud including a gear engaging head and a cylindrical shank of reduced diameter revoluble relative to the support to present successive portions of the head in gear contacting relation, a hardened replaceable seat upon the support for the head of the stud, means for securing the stud in any one of several positions of rotative adjustment, and means for holding a gear in engagement with the stud.

9. In a gear chuck of the character described, a support, a locating stud carried thereby for engagement intermediate adjacent faces of contiguous teeth of a gear for locating same in relation to the support, said stud including a gear engaging head and a cylindrical shank of reduced diameter revoluble relative to the support to present successive portions of the head in gear contacting relation, a bushing mounted in the support in which the stud is revolubly mounted, a seat for the stud head formed upon the bushing, means for locking the bushing against rotative movement relative to the support, means for locking the stud against rotative adjustment relative to the bushing, and means for holding a gear in engagement with the stud.

10. A locating stud for a gear chuck adapted to engage adjacent faces of contiguous gear teeth including a conical head and a cylindrical shank of reduced diameter, the conical head having therein a peripheral clearance groove substantially coincident with the crowns of the gear teeth when engaging the stud.

11. A locating stud for a gear chuck adapted to engage adjacent faces of contiguous gear teeth including a conical head and a cylindrical shank of reduced diameter, the conical surface of the head being interrupted substantially coincident with the crowns of the gear teeth when engaged therewith whereby the contact surface will terminate at such interruption thereby avoiding the formation of an offset by wearing of the stud head.

12. As an article of manufacture, a locating stud for a gear chuck, including a head portion for engagement between succeeding teeth of a gear, a shank portion and a seating portion surrounding the shank for engagement with a work support, the contact area of the head being relieved within the limits of the engaging gear teeth and in spaced relation with the seating portion to avoid the formation of an offset shoulder by wear of the stud head.

13. As an article of manufacture, a locating stud for a gear chuck including a conical head and a cylindrical shank of less diameter than the head, the head terminating at its base in a cylindrical continuation coincident with the base of the conical portion thereof.

JOHN RUSSELL GARRISON.